(12) United States Patent
Jang et al.

(10) Patent No.: US 11,177,536 B2
(45) Date of Patent: Nov. 16, 2021

(54) SEPARATOR WITH REDUCED IGNITION PHENOMENON UPON BATTERY PERFORATION AND BATTERY INCLUDING THE SAME

(71) Applicant: LG CHEM, LTD., Seoul (KR)

(72) Inventors: Dae-Sung Jang, Daejeon (KR); Yeon-Soo Kim, Daejeon (KR); Dong-Wook Sung, Daejeon (KR); Hyun-Sup Lee, Daejeon (KR); So-Mi Jeong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 134 days.

(21) Appl. No.: 16/472,551

(22) PCT Filed: Nov. 8, 2018

(86) PCT No.: PCT/KR2018/013571
§ 371 (c)(1),
(2) Date: Jun. 21, 2019

(87) PCT Pub. No.: WO2019/093798
PCT Pub. Date: May 16, 2019

(65) Prior Publication Data
US 2020/0194761 A1     Jun. 18, 2020

(30) Foreign Application Priority Data
Nov. 8, 2017 (KR) .......................... 10-2017-0148085

(51) Int. Cl.
*H01M 50/449* (2021.01)
*H01M 10/0525* (2010.01)
(Continued)

(52) U.S. Cl.
CPC ..... *H01M 50/449* (2021.01); *H01M 10/0525* (2013.01); *H01M 50/411* (2021.01); *H01M 50/446* (2021.01)

(58) Field of Classification Search
CPC . H01M 50/449; H01M 50/446; H01M 50/411
(Continued)

(56) References Cited

U.S. PATENT DOCUMENTS

| 4,576,993 A | 3/1986 | Tamplin et al. |
| 5,240,655 A | 8/1993 | Troffkin et al. |

(Continued)

FOREIGN PATENT DOCUMENTS

| CN | 103531734 A | * | 1/2014 |
| CN | 104583245 A | | 4/2015 |

(Continued)

OTHER PUBLICATIONS

International Search Report dated Feb. 19, 2019, issued in corresponding International Application No. PCT/KR2018/013571.
(Continued)

*Primary Examiner* — Sean P Cullen
(74) *Attorney, Agent, or Firm* — Morgan, Lewis & Bockius LLP

(57) ABSTRACT

Disclosed is a separator which includes a porous polymer substrate including a polymer showing a variation in phase angle represented by the following Formula 1 at 0.1 Hz depending on an increase in temperature. An electrochemical device including the separator is also disclosed.

Variation in phase angle at 0.1 Hz=[(Phase angle$_{190}$−Phase angle$_{280}$)/(Phase angle$_{190}$)]×100≥0%, [Formula 1]

wherein Phase angle$_{190}$ means the phase angle of the porous polymer substrate at 0.1 Hz and 190° C., and (Continued)

Phase angle$_{280}$ means the phase angle of the porous polymer substrate at 0.1 Hz and 280° C.

17 Claims, 4 Drawing Sheets

(51) Int. Cl.
  *H01M 50/411* (2021.01)
  *H01M 50/446* (2021.01)
(58) Field of Classification Search
  USPC .......................... 429/144, 251, 254
  See application file for complete search history.

(56) References Cited

U.S. PATENT DOCUMENTS

| | | | |
|---|---|---|---|
| 5,856,039 A * | 1/1999 | Takahashi | H01M 50/449 429/129 |
| 2004/0242708 A1 | 12/2004 | Hasegawa et al. | |
| 2008/0214687 A1 | 9/2008 | Muller et al. | |
| 2009/0233146 A1 | 9/2009 | Lee et al. | |
| 2010/0040953 A1 | 2/2010 | Takata et al. | |
| 2010/0168346 A1 | 7/2010 | Lee et al. | |
| 2011/0171407 A1 | 7/2011 | Mazzola et al. | |
| 2014/0051808 A1 | 2/2014 | Tse | |
| 2014/0186680 A1* | 7/2014 | Kim | H01M 2/1653 429/144 |
| 2015/0274908 A1* | 10/2015 | Yanagishita | B01D 71/26 210/500.36 |
| 2017/0155113 A1 | 6/2017 | Hashiwaki et al. | |
| 2018/0002516 A1 | 1/2018 | Canich et al. | |
| 2018/0175370 A1 | 6/2018 | Kim et al. | |

FOREIGN PATENT DOCUMENTS

| | | | |
|---|---|---|---|
| CN | 107148446 A | | 9/2017 |
| EP | 2528141 A2 | | 11/2012 |
| JP | H05-251070 A | | 9/1993 |
| JP | 2002-134091 A | | 5/2002 |
| JP | 2005-071882 A | | 3/2005 |
| JP | 2013-516543 A | | 5/2013 |
| KR | 10-1999-0015098 A | | 3/1999 |
| KR | 10-2008-0033279 A | | 4/2008 |
| KR | 10-0819332 B1 | | 4/2008 |
| KR | 10-2009-0036997 A | | 4/2009 |
| KR | 10-2014-0070219 A | | 6/2014 |
| KR | 20140071094 A | * | 6/2014 |
| KR | 10-2016-0132597 A | | 11/2016 |
| KR | 10-2017-0063330 A | | 6/2017 |
| KR | 10-2017-0069141 A | | 6/2017 |

OTHER PUBLICATIONS

Anonymous, Polymer Molecular Weight Distribution and Definitions of MW Averages, Apr. 30, 2015 (Apr. 30, 2015), pp. 1-4, XP055361202, Retrieved from the Internet: URL:http://cn.agilent.com/cs/library/technicaloverviews/public/5990-7890EN.pdf [retrieved on Apr. 3, 2017].

Jonathan P. Blitz et al., The Characterization of Short Chain Branching in Polyethylene Using Fourier Transform Infrared Spectroscopy, Journal of Applied Polymer Science, vol. 51, No. 1, Jan. 3, 1994 (Jan. 3, 1994), pp. 13-20, XP055635327, US ISSN: 0021-8995, DOI: 10.1002/app.1994.070510102.

* cited by examiner

SEPARATOR WITH REDUCED IGNITION PHENOMENON UPON BATTERY PERFORATION AND BATTERY INCLUDING THE SAME

TECHNICAL FIELD

The present disclosure relates to a separator and an electrochemical device including the same. More particularly, the present disclosure relates to a separator which has excellent safety by reducing an ignition phenomenon upon the perforation of a battery, and an electrochemical device including the same.

The present application claims priority to Korean Patent Application No. 10-2017-0148085 filed on Nov. 8, 2017 in the Republic of Korea, the disclosures of which are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte. However, such a lithium ion battery has a safety problem, such as ignition or explosion, caused by the use of an organic electrolyte, and requires a complicated manufacturing process.

Recently, a lithium ion polymer battery has improved such disadvantages of a lithium ion battery and thus has been regarded as one of the next-generation batteries. However, such a lithium ion polymer battery still shows relatively lower capacity as compared to a lithium ion battery, and particularly shows insufficient discharge capacity at low temperature. Thus, there is an imminent need for improving this.

Although such electrochemical devices have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. Particularly, a polyolefin-based porous substrate used conventionally as a separator for an electrochemical device shows a severe heat shrinking behavior at a temperature of 100° C. or higher due to its material property and a characteristic during its manufacturing process, including orientation, thereby causing a short-circuit between a cathode and an anode.

In addition, in the case of a conventional polyolefin-based porous polymer substrate, it undergoes a decrease in viscosity at high temperature, and thus the viscoelasticity of the porous substrate is present in a liquid-like region. In the case of a separator using such a porous substrate, it is damaged during a nail test, which may result in ignition of a lithium ion battery and significant degradation of the safety thereof.

Therefore, there still is a need for developing a porous polymer substrate for a separator having improved safety.

DISCLOSURE

Technical Problem

Therefore, the present disclosure is directed to providing a separator having excellent safety by reducing an ignition phenomenon upon the perforation of a battery.

The present disclosure is also directed to providing an electrochemical device including the separator.

Technical Solution

In one aspect of the present disclosure, there are provided separators according to the following embodiments.

According to the first embodiment of the present disclosure, there is provided a separator which includes a porous polymer substrate including a polymer showing a variation in phase angle represented by the following Formula 1 at 0.1 Hz depending on an increase in temperature:

$$\text{Variation in phase angle at } 0.1 \text{ Hz} = [(\text{Phase angle}_{190} - \text{Phase angle}_{280})/(\text{Phase angle}_{190})] \times 100 \geq 0\%, \quad [\text{Formula 1}]$$

wherein Phase angle$_{190}$ means the phase angle of the porous polymer substrate at 0.1 Hz and 190° C., and Phase angle$_{280}$ means the phase angle of the porous polymer substrate at 0.1 Hz and 280° C.

According to the second embodiment of the present disclosure, there is provided the separator as defined in the first embodiment, wherein the polymer shows a variation in phase angle represented by the following Formula 2 at a storage modulus G' of the polymer of $10^5$ Pa:

$$\text{Variation in phase angle at a storage modulus of } 10^5 \text{ Pa} = [(\text{Phase angle}_{190} - \text{Phase angle}_{280})/(\text{Phase angle}_{190})] \times 100 \geq 0\%, \quad [\text{Formula 2}]$$

wherein Phase angle$_{190}$ means the phase angle of the porous polymer substrate at 190° C., and Phase angle$_{280}$ means the phase angle of the porous polymer substrate at 280° C.

According to the third embodiment of the present disclosure, there is provided the separator as defined in the first or the second embodiment, wherein the polymer shows a variation in viscosity represented by the following Formula 3:

$$\text{Variation in viscosity} = [(\eta_{190} - \eta_{280})/(\eta_{190})] \times 100 \leq 35\%, \quad [\text{Formula 3}]$$

wherein $\eta_{190}$ is the viscosity of a porous polymer substrate at 190° C., and $\eta_{280}$ is the viscosity of a porous polymer substrate at 280° C.

According to the fourth embodiment of the present disclosure, there is provided the separator as defined in any one of the first to the third embodiments, wherein the polymer shows a variation in storage modulus G' represented by the following Formula 4:

$$\text{Variation in storage modulus} = [(G'_{190} - G'_{280})/(G'_{190})] \times 100 \leq 35\%, \quad [\text{Formula 4}]$$

wherein G' 190 is the storage modulus of a porous polymer substrate at 190° C., and G'$_{280}$ is the storage modulus of a porous polymer substrate at 280° C.

According to the fifth embodiment of the present disclosure, there is provided the separator as defined in any one of the first to the fourth embodiments, wherein the polymer includes at least one of polyolefins and modified polyolefins.

According to the sixth embodiment of the present disclosure, there is provided the separator as defined in any one of the first to the fifth embodiments, wherein the polymer has a Z average molecular weight of 700,000-2,000,000, a melt index of 0.05-4 g/10 min, and a branch content of 5-25%.

According to the seventh embodiment of the present disclosure, there is provided the separator as defined in any one of the first to the sixth embodiments, which further includes a porous coating layer formed on at least one surface of the porous polymer substrate, and containing a plurality of inorganic particles and a binder polymer positioned on the whole or a part of the surface of the inorganic particles to connect the inorganic particles with each other and fix them.

According to the eighth embodiment of the present disclosure, there is provided the separator as defined in the seventh embodiment, wherein the binder polymer is any one selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan, carboxymethyl cellulose, and combinations thereof.

According to the ninth embodiment of the present disclosure, there is provided the separator as defined in the seventh or the eighth embodiment, wherein the inorganic particles include inorganic particles having a dielectric constant of 5 or more, inorganic particles having lithium ion transportability or a combination thereof.

In another aspect of the present disclosure, there are provided electrochemical devices according to the following embodiments.

According to the tenth embodiment of the present disclosure, there is provided an electrochemical device including a cathode, an anode and a separator interposed between the cathode and the anode, wherein the separator is defined herein.

According to the eleventh embodiment of the present disclosure, there is provided the electrochemical device as defined in the tenth embodiment, which is a lithium secondary battery.

Advantageous Effects

According to an embodiment of the present disclosure, it is possible to provide a separator for a secondary battery which has improved rheological properties, significantly reduces an ignition phenomenon occurring upon the perforation of a battery, and provides improved safety.

BEST MODE

Figure 1:
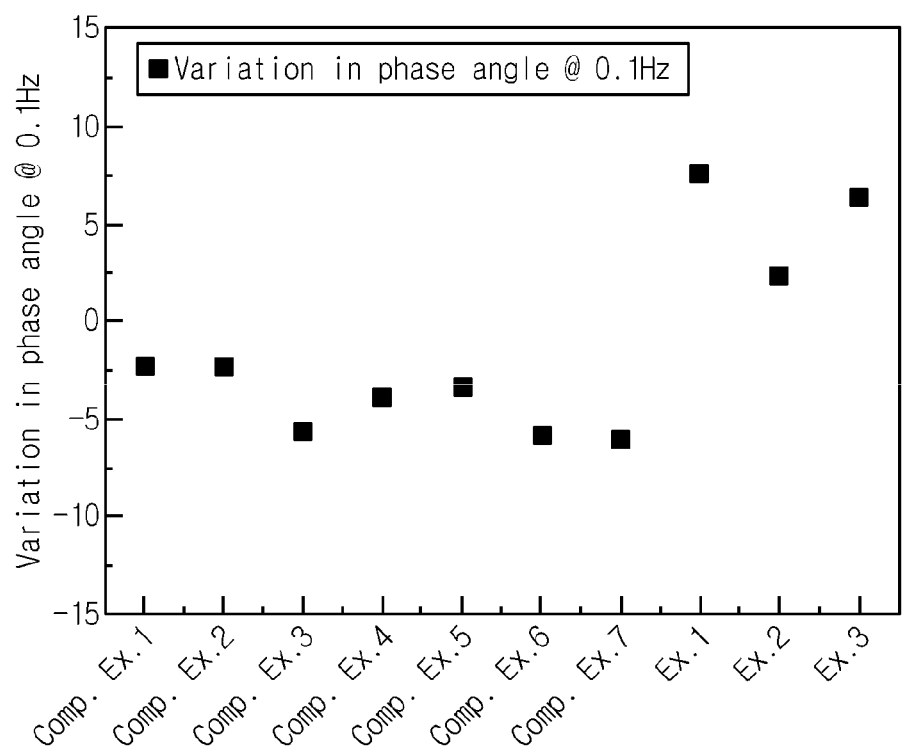
FIG. 1 is a graph illustrating the results of evaluation of a variation in phase angle at 0.1 Hz depending on an increase in temperature for each of the separators according to Examples 1-3 and Comparative Examples 1-7.

Hereinafter, preferred embodiments of the present disclosure will be described in detail. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

As mentioned above, in the case of a conventional polyolefin-based polymer substrate, it undergoes a decrease in viscosity at high temperature, and thus the viscoelasticity of the porous substrate is present in a liquid-like region. Thus, when such a porous polymer substrate is applied to a separator, the separator is damaged during a nail test (nail perforation test) and the safety of a secondary battery related with explosion may be degraded significantly.

According to the present disclosure, the rheological properties of a porous polymer substrate is improved so that the porous polymer substrate may have solid-like properties in a viscoelastic region through a branching phenomenon even though it tends to undergo a decrease in viscosity at high temperature similarly to the conventional polymer substrate, or have solid-like properties as the temperature increases through crosslinking in a viscoelastic region even though it maintains constant viscosity at high temperature. As a result, it is possible to significantly improve the safety of an electrochemical device using such a porous polymer substrate as a separator.

A system capable of determining the rheological properties, such as dynamic viscoelasticity value, of a polymer forming a porous polymer substrate is known. Such a system for determining dynamic viscoelasticity allows evaluation of viscoelastic properties of solid samples, such as polymer films and sheets.

For example, a system for determining dynamic viscoelasticity applies deformation to tensileness, compression, bending, or vibration such as shear and detects stress response and displacement caused thereby to calculate a dynamic viscoelasticity value. Particular examples of instruments capable of determining such dynamic viscoelasticity include various instruments, such as Conventional Rheometer (TA Co. ARES-G2), or the like.

Essentially, dynamic viscoelasticity values which can be derived from the results determined by using sinusoidal vibration torques include G' called elastic coefficient, elastic modulus, storage coefficient, modulus of storage or storage modulus; G" called viscosity coefficient, viscosity modulus, loss modulus, modulus of loss or loss coefficient; tangent of phase angle (δ) and phase angle (δ), which is a G"/G' ratio; and complex modulus which can be derived by using the above values.

While storage modulus G' can be calculated from the stress response determined at the maximum displacement, loss modulus G" can be calculated from the stress response determined from the displacement 0, or can be calculated by extracting storage modulus G' and loss modulus G" by using the Fourier transformation and collecting the stress responses of multiple samples during the maintenance of each cycle.

The periodic deformation may be deformation caused by linear reciprocation. In a variant, the periodic deformation may be linear reciprocation-based deformation applied to a rotating polymer sample, but is not limited thereto.

The frequency and deformation ratio of the periodic deformation may be varied depending on the type of a polymer sample to be used, type of periodic deformation applied to a polymer sample or the temperature of a polymer sample.

The frequency of periodic deformation may be 0.01-100 Hz, 0.05-90 Hz, or 0.1-50 Hz.

In addition, the deformation ratio of periodic deformation may be 0.1-1.5% or 0.15-1.0%, but is not limited thereto.

More particularly, the measuring unit for determining the dynamic viscoelasticity value may increase the frequency from 0.01 Hz to 100 Hz under the condition of a deformation ratio of 0.5% of the periodic deformation.

The term 'phase angle' means a loss tangent angle (tan δ) calculated as a ratio of storage modulus to loss modulus and may be calculated according to the following formula:

$$\delta = \tan^{-1}(G''/G')$$

wherein δ is a phase angle, G' is a storage modulus, and G" is a loss modulus. Particularly, it can be thought that G' is an index indicating the elasticity of a porous polymer substrate, and G" is an index indicating the viscosity of a porous polymer substrate.

The separator according to an embodiment of the present disclosure includes a porous polymer substrate including a polymer showing a variation in phase angle represented by the following Formula 1 at 0.1 Hz depending on an increase in temperature:

Variation in phase angle at 0.1 Hz=[(Phase angle$_{190}$−Phase angle$_{280}$)/(Phase angle$_{190}$)]×100≥0%, [Formula 1]

wherein Phase angle$_{190}$ means the phase angle of the porous polymer substrate at 0.1 Hz and 190° C., and Phase angle$_{280}$ means the phase angle of the porous polymer substrate at 0.1 Hz and 280° C.

The expression 'a variation in phase angle of 0% or more at 0.1 Hz' means that the porous polymer substrate undergoes an increase in elasticity as the temperature is increased. This suggests that the content of a crosslinked structure or the branch content in the polymer is increased. The variation in phase angle at 0.1 Hz may be 0-100%, 0-30%, 0-20%, 2-8%, or 2.5-7.5%.

The polymer may show a variation in phase angle represented by the following Formula 2 at a storage modulus G' of the polymer of $10^5$ Pa:

Variation in phase angle at a storage modulus of $10^5$ Pa=[(Phase angle$_{190}$−Phase angle$_{280}$)/(Phase angle$_{190}$)]×100≥0%, [Formula 2]

wherein Phase angle$_{190}$ means the phase angle of the porous polymer substrate at 190° C., and Phase angle$_{280}$ means the phase angle of the porous polymer substrate at 280° C.

The expression 'a variation in phase angle of 0% or more at a storage modulus G' of the polymer of $10^5$ Pa' means that the porous polymer substrate undergoes an increase in elasticity as the temperature is increased. This suggests that the content of a crosslinked structure or the branch content in the polymer is increased. The polymer may show a variation in phase angle at a storage modulus G' of the polymer of $10^5$ Pa of 0-100%, 0-30%, 0-20%, 2-10%, or 2.5-10%.

In addition, the polymer may show a variation in viscosity represented by the following Formula 3:

Variation in viscosity=[(η$_{190}$−η$_{280}$)/(η$_{190}$)]×100≤35%, [Formula 3]

wherein η$_{190}$ is the viscosity of a porous polymer substrate at 190° C., and η$_{280}$ is the viscosity of a porous polymer substrate at 280° C.

The expression 'a variation in viscosity of 35% or less' means that the polymer has high viscosity stability against variations in temperature, and particularly means that the polymer undergoes crosslinking more than polymer chain cleavage as the temperature is increased from 190° C. to 280° C. The polymer may show a variation in viscosity of −50 to 35%, −20 to 35%, 10 to 35%, or 11 to 33%.

The polymer may show a variation in storage modulus G' represented by the following Formula 4:

Variation in storage modulus=[(G'$_{190}$−G'$_{280}$)/(G'$_{190}$)]×100≤35%, [Formula 4]

wherein G'$_{190}$ is the storage modulus of a porous polymer substrate at 190° C., and G'$_{280}$ is the storage modulus of a porous polymer substrate at 280° C.

The expression 'a variation in storage modulus G' of 35% or less' means that the polymer has high storage modulus stability against variations in temperature, and particularly means that the polymer undergoes crosslinking more than polymer chain cleavage as the temperature is increased from 190° C. to 280° C. The polymer may show a variation in storage modulus G' of −50 to 35%, −20 to 35%, 5 to 35%, 5 to 33%, or 6 to 32.5%.

There is no particular limitation in the polymer, as long as it shows the above-described melting properties. Non-limiting examples of the polymer include polyolefins, modified polyolefins, or the like, and they may be used alone or in combination. In addition, when two or more types of polymers are used, they may be mixed to form a porous polymer substrate, or they may form composite layers having two or more layers in which different polymers form different layers and at least one layer thereof may include two or more types of polymers.

Herein, polyolefins may include polyethylenes, such as high density polyethylene, linear high density polyethylene, low density polyethylene and ultrahigh-molecular weight polyethylene, and polyolefinic polymers, such as polypropylene, polybutylene, polypentene, or the like. Such polyolefins may be used alone or in combination.

The modified polyolefins may be copolymers of olefins (such as ethylene, propylene, or the like) with C2-C20 alpha-olefins. The alpha-olefin may be at least one selected from the group consisting of 1-butene, 1-pentene, 1-hexene, 4-methyl-1-pentene, 1-octene, 1-decene, 1-dodecene, 1-tetradecene, 1-hexadecene, 1-octadecene and 1-eicosene, or may have a structure containing at least one of a vinyl group, ketone group, ester group and an acid group in the polymer chain. In the ethylene/alpha-olefin copolymer, the content of alpha-olefin may be about 0.5-10 wt %, preferably about 1-5 wt %, but is not limited thereto.

According to an embodiment of the present disclosure, the polyethylene may be a high-molecular weight polyethylene; polyethylene other than high-molecular weight polyethylene; or an ultrahigh-molecular weight polyethylene having a weight average molecular weight of 600,000 or more (e.g. 600,000-3,000,000). Herein, the ultrahigh-molecular weight polyethylene may be an ethylene homopolymer or a copolymer thereof containing a small amount of alpha-olefin. The alpha-olefin may have any one branch selected from a vinyl group, ketone group, methyl group, ester group and an acid group in the polymer chain, or may have two or more such branches.

The polyethylene other than high-molecular weight polyethylene may be at least one selected from high-density polyethylene, medium-density polyethylene, branched low-density polyethylene and linear low-density polyethylene.

According to another embodiment of the present disclosure, the polypropylene may be propylene homopolymer or a copolymer thereof containing an alpha-olefin. The alpha-olefin is the same as described above.

According to still another embodiment of the present disclosure, the polymer may be a blend of polyethylene with polypropylene, wherein polypropylene may be present in an amount of 5 wt % or less based on the total polymer. Herein, polyethylene and polypropylene are the same as described above.

In addition, the porous polymer substrate may be formed of polyethylene terephthalate, polybutylene terephthalate, polyester, polyacetal, polyamide, polycarbonate, polyimide, polyetherether ketone, polyether sulfone, polyphenylene oxide, polyphenylene sulfide, or polyethylene naphthalene, alone or in combination, besides the above-mentioned polyolefins.

It is required for the polymer forming the porous polymer substrate to have a predetermined Z average molecular weight, melt index (MI) and branch content so that the porous polymer substrate may have the above-described improved rheological properties. Herein, 'melt index (MI)' has the same meaning as 'melt flow index'.

According to an embodiment of the present disclosure, the polymer may have a Z average molecular weight ($M_z$) of 700,000-2,000,000, 800,000-1,300,000, or 800,000-1,200,000.

According to another embodiment of the present disclosure, the polymer may have a melt index (MI) of 0.05-4 g/10 min, 0.10-3.5 g/10 min, 0.15-3.0 g/10 min, or 0.39-2.0 g/10 min. The melt index means a flux measured when a polymer is extruded from a piston in the form of a molten thermoplastic polymer product under a specific load and temperature, and is an index indicating how the molten product flows with ease.

According to another embodiment of the present disclosure, the polymer may have a branch content of 5-25%, 6-20%, 8-20%, or 10-20%.

Herein, the branch content of the polymer is a ratio of branches present in the polymer chain and may be calculated from the results of Fourier Transform-Infrared spectrometry (FT-IR) for the polymer.

The branches of a polymer generate radicals through oxidation and function to provide sites for crosslinking by virtue of the radicals. Therefore, as the number of branch content is increased, the degree of crosslinking reactivity of the polymer is increased. Since the polymer according to an embodiment of the present disclosure satisfies the above-defined branch content, it has solid-like properties through a branching phenomenon in the viscoelastic region even though it tends to undergo a decrease in viscosity at high temperature, like the conventional polymer substrate. Otherwise, it may show solid-like properties as the temperature is increased through crosslinking in the viscoelastic region even though it has constant viscosity at high temperature.

When the polymer forming the porous polymer substrate has a melt index higher than the above-defined range even if it satisfies the above-defined range of branch content, the polymer initially surrounds the nail perforated during a nail test but flows down subsequently, and thus cannot provide an effect of preventing a short-circuit and improving stability sufficiently. When the melt index is lower than the above-defined range, flowability is significantly low during melting. As a result, it is difficult for the polymer to surround the nail perforated during a nail test. Therefore, it is important that the polymer of the porous polymer substrate according to an embodiment of the present disclosure is controlled to satisfy all of the above-defined ranges of Z average molecular weight, melt index and branch content.

According to an embodiment of the present disclosure, the polymer forming the porous polymer substrate may have a Z average molecular weight of 700,000-2,000,000, 800,000-1,300,000, or 800,000-1,200,000; a melt index (MI) of 0.05-4 g/10 min, 0.10-3.5 g/10 min, 0.15-3.0 g/10 min, or 0.39-2.0 g/10 min; and a branch content of 5-25%, 6-20%, 8-20%, or 10-20%.

There is no particular limitation in the thickness of the porous polymer substrate, the porous polymer substrate has a thickness of 1-100 μm, particularly 5-50 μm. Although there is no particular limitation in the size of the pores present in the porous substrate and porosity, the pore size and porosity may be 0.01-50 μm and 10-95%, respectively.

According to an embodiment of the present disclosure, the separator may further include a porous coating layer formed on at least one surface of the porous polymer substrate and containing a plurality of inorganic particles and a binder polymer positioned on the whole or a part of the surface of the inorganic particles to connect the inorganic particles with each other and fix them.

The binder polymer used for forming the porous coating layer may be one used currently for forming a porous coating layer in the art. Particularly, a polymer having a glass transition temperature ($T_g$) of −200 to 200° C. may be used. This is because such a polymer can improve the mechanical properties, such as flexibility and elasticity, of the finally formed porous coating layer. Such a binder polymer functions as a binder which connects and stably fixes the inorganic particles with each other, and thus contributes to prevention of degradation of mechanical properties of a separator having a porous coating layer.

In addition, it is not essentially required for the binder polymer to have ion conductivity. However, when using a polymer having ion conductivity, it is possible to further improve the performance of an electrochemical device. Therefore, a binder polymer having a dielectric constant as high as possible may be used. In fact, since the dissociation degree of a salt in an electrolyte depends on the dielectric constant of the solvent for the electrolyte, a binder polymer having a higher dielectric constant can improve the salt dissociation degree in an electrolyte. The binder polymer may have a dielectric constant ranging from 1.0 to 100 (measured at a frequency of 1 kHz), particularly 10 or more.

In addition to the above-mentioned function, the binder polymer may be characterized in that it is gelled upon the impregnation with a liquid electrolyte and thus shows a high degree of swelling. Thus, the binder polymer has a solubility parameter (i.e., Hildebrand solubility parameter) of 15-45 $MPa^{1/2}$ or 15-25 $MPa^{1/2}$ and 30-45 $MPa^{1/2}$. Therefore, hydrophilic polymers having many polar groups may be used more frequently as compared to hydrophobic polymers, such as polyolefins. When the solubility parameter is less than 15 $MPa^{1/2}$ and more than 45 $MPa^{1/2}$, it is difficult for the binder polymer to be swelled with a conventional liquid electrolyte for a battery.

Non-limiting examples of the binder polymer include but are not limited to: polyvinylidene fluoride-co-hexafluoropropylene, polyvinylidene fluoride-co-trichloro ethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose.

The weight ratio of the inorganic particles to the binder polymer may be 50:50-99:1, particularly 70:30-95:5. When the weight ratio of the inorganic particles to the binder polymer satisfies the above-defined range, the content of the binder polymer is increased to prevent a decrease in pore size and porosity of the resultant coating layer and to solve the problem of degradation of peeling resistance of the resultant coating layer caused by a decreased content of binder polymer.

The separator according to an embodiment of the present disclosure may further include other additives as ingredients of the porous coating layer, besides the inorganic particles and binder polymer.

According to the present disclosure, the inorganic particles may be inorganic particles having a dielectric constant of 5 or more, inorganic particles having lithium ion transportability or a combination thereof.

Non-limiting examples of the inorganic particles having a dielectric constant of 5 or more include $BaTiO_3$, $Pb(Zr,Ti)O_3$ (PZT), $Pb_{1-x}La_xZr_{1-y}Ti_yO_3$ (PLZT), $Pb(Mg_3Nb_{2/3})O_3PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, AlO(OH), $Al_2O_3 \cdot H_2O$, $TiO_2$ and SiC, or a mixture of two or more of them.

As used herein, 'inorganic particles having lithium ion transportability' refers to inorganic particles containing a lithium element and transporting lithium, not storing lithium. Non-limiting examples of the inorganic particles having lithium ion transportability include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($1<x<4$, $0<y<13$), such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, $0<x<3$, $0<y<2$, $0<z<4$) and $P_2S_5$-based glass ($Li_xP_yS_z$, $0<x<3$, $0<y<3$, $0<z<7$), or a combination thereof.

According to another embodiment of the present disclosure, the inorganic particles may have an average particle diameter of 0.05-3 μm, particularly 0.1-2.7 μm, and more particularly 0.5-2.5 μm.

Although there is no particular limitation in the thickness of the porous coating layer, the porous coating layer may have a thickness of 1-10 μm, particularly 1.5-6 μm. In addition, the porous coating layer preferably has a porosity of 35-65%, but is not limited thereto.

According to an embodiment of the present disclosure, the porous coating layer may be an oil-based coating layer using organic slurry based on an organic solvent or an aqueous slurry-derived aqueous coating layer using water as a solvent. In the case of the aqueous coating layer, it is advisable in that it facilitates thin film coating and reduces the resistance of a separator.

The separator including a porous coating layer according to an embodiment of the present disclosure may be obtained by the method descried hereinafter.

First, slurry for forming a porous coating layer may be prepared by dissolving a binder polymer in a solvent, adding inorganic particles thereto, and dispersing them. The inorganic particles may be added after they are pulverized to a predetermined average particle diameter. Otherwise, the inorganic particles may be added to a binder polymer solution, and then pulverized and dispersed while controlling them to have a predetermined average particle diameter by using a ball milling process, or the like.

Although there is no particular limitation in the process for coating the composition for forming a porous coating layer onto the porous substrate, it is preferred to use a slot coating or dip coating process. A slot coating process includes coating a composition supplied through a slot die onto the whole surface of a substrate and is capable of controlling the thickness of a coating layer depending on the flux supplied from a metering pump. In addition, dip coating includes dipping a substrate into a tank containing a composition to carry out coating and is capable of controlling the thickness of a coating layer depending on the concentration of the composition and the rate of removing the substrate from the composition tank. Further, in order to control the coating thickness more precisely, it is possible to carry out post-metering through a Mayer bar or the like, after dipping.

Then, the porous substrate coated with the composition for forming a porous coating layer is dried by using a dryer, such as an oven, thereby forming porous coating layers on at least one surface of the porous substrate.

In the porous coating layers, the inorganic particles are bound among themselves by the binder polymer while they are packed and are in contact with each other. Thus, interstitial volumes are formed among the inorganic particles and the interstitial volumes become vacant spaces to form pores.

In other words, the binder polymer attaches the inorganic particles to each other so that they may retain their binding states. For example, the binder polymer connects and fixes the inorganic particles with each other. In addition, the pores of the porous coating layer are those formed by the interstitial volumes among the inorganic particles which become vacant spaces. The space may be defined by the inorganic particles facing each other substantially in a closely packed or densely packed structure of the inorganic particles.

The electrochemical device according to another embodiment of the present disclosure includes a cathode, an anode and a separator interposed between the cathode and the anode, wherein the separator is the above-described separator according to an embodiment of the present disclosure.

The electrochemical device includes any device which carries out electrochemical reaction, and particular examples thereof include all types of primary batteries, secondary batteries, fuel cells, solar cells or capacitors, such as super capacitor devices. Particularly, among the secondary batteries, lithium secondary batteries, including lithium metal secondary batteries, lithium ion secondary batteries, lithium polymer secondary batteries or lithium ion polymer batteries, are preferred.

The two electrodes, cathode and anode, used in combination with the separator according to the present disclosure are not particularly limited, and may be obtained by allowing electrode active materials to be bound to an electrode current collector through a method generally known in the art. Among the electrode active materials, non-limiting examples of a cathode active material include conventional cathode active materials that may be used for the cathodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of an anode active material include conventional anode active materials that may be used for the anodes for conventional electrochemical devices. Particularly, lithium-intercalating materials, such as lithium metal or lithium alloys, carbon, petroleum coke, activated carbon, graphite or other carbonaceous materials, are used preferably. Non-limiting examples of a cathode current collector include foil made of aluminum, nickel or a combination thereof. Non-limiting examples of an anode current collector include foil made of copper, gold, nickel, nickel alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

MODE FOR DISCLOSURE

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Method for Determining Z Average Molecular Weight

A polymer sample was pretreated by dissolving it in 1,2,4-trichlorobenzene containing 0.0125% of BHT by using PL-SP260 at 160° C. for 10 hours, and then $M_z$ (Z average molecular weight) thereof was determined by using PL-GPC220 at a temperature of 160° C.

Herein, the Mark-Houwink constants used for carrying out calibration are as follows.

KPS=$19 \times 10^{-3}$ mL/g, αPS=0.655
KPE=$40.6 \times 10^{-3}$ mL/g, αPE=0.725
KPP=$19 \times 10^{-3}$ mL/g, αPP=0.725

Method for Determining Melt Index

The melt index (MI) of a polymer particularly corresponds to a high-load melt index, and was determined according to ASTM D1238 at 190° C. under a load of 21.6 kg.

Method for Determining Branch Content

Standard samples (samples having a branch content 5%, 10%, 20% or 30%) were used to carry out calibration based on the intensity of each of the following peaks, and then the branch content of a polymer was determined based on this.

Absorbance of a methyl branch at 935 $cm^{-1}$
Absorbance of an ethyl branch at 770 $cm^{-1}$
Absorbance of a butyl branch at 893 $cm^{-1}$
Absorbance of an isobutyl branch at 920 $cm^{-1}$
Absorbance of a hexyl branch at 888 $cm^{-1}$ Example 1

<Manufacture of Cathode and Anode>

First, 96.7 parts by weight of $Li[Ni_{0.6}Mn_{0.2}Co_{0.2}]O_2$ functioning as a cathode active material, 1.3 parts by weight of graphite functioning as a conductive material and 2.0 parts by weight of polyvinylidene fluoride (PVdF) functioning as a binder were mixed to prepare a cathode mixture. The resultant cathode mixture was dispersed in 1-methyl-2-pyrrolidone functioning as a solvent to prepare cathode mixture slurry. Then, the slurry was coated onto both surfaces of aluminum foil with a thickness of 20 μm, followed by drying and pressing, to obtain a cathode.

Next, 97.6 parts by weight of artificial graphite and natural graphite (weight ratio 90:10) functioning as active materials, 1.2 parts by weight of styrene butadiene rubber (SBR) functioning as a binder and 1.2 parts by weight of carboxymethyl cellulose (CMC) were mixed to prepared an anode mixture. The anode mixture was dispersed in ion exchange water functioning as a solvent to prepare anode mixture slurry. Then, the slurry was coated onto both surfaces of copper foil with a thickness of 20 μm, followed by drying and pressing, to obtain an anode.

<Manufacture of Separator>

First, 16 parts by weight of polyvinylidene fluoride-co-hexafluoropropylene (PVdF-HFP) as a binder polymer was added to 184 parts by weight of acetone at a solid content of 8 wt % and dissolved therein at 50° C. for about 12 hours or more to prepare a binder polymer solution. Then, alumina ($Al_2O_3$) as inorganic particles having an average particle diameter of 500 nm were added to the prepared binder solution so that the ratio of binder polymer to inorganic particles might be 10:90, and then the inorganic particles were dispersed to obtain slurry for a porous coating layer.

The obtained slurry was coated using a dip coating method onto both surfaces of a film substrate (thickness: 9 μm) made of polyethylene (Z average molecular weight: 1,200,000, melt index: 0.4 g/10 min, branch content: 8%), and the coating thickness was controlled to about 10 μm to obtain a separator having porous coating layers on both surfaces thereof <Manufacture of Lithium Secondary Battery>

To a mixed organic solvent containing ethylene carbonate (EC), propylene carbonate (PC) and diethyl carbonate (DEC) at a volume ratio of 3:3:4, $LiPF_6$ was dissolved to a concentration of 1.0 M to prepare a non-aqueous electrolyte.

The above-mentioned cathode, anode and the separator were stacked so that the separator might be interposed between the cathode and anode, the resultant stack was received in a pouch, and then the electrolyte was injected thereto to obtain a lithium secondary battery.

Example 2

A separator and a secondary battery were obtained in the same manner as Example 1, except that a film substrate made of polyethylene (Z average molecular weight: 800,000, melt index: 2.0 g/10 min, branch content: 20%) were used.

Example 3

A separator and a secondary battery were obtained in the same manner as Example 1, except that a film substrate made of polyethylene (Z average molecular weight: 1,050,000, melt index: 0.39 g/10 min, branch content: 10%) were used.

Comparative Example 1

A separator and a secondary battery were obtained in the same manner as Example 1, except that a film substrate made of polyethylene (Z average molecular weight: 1,090,000, melt index: 0.41 g/10 min, branch content: 2%) were used.

Comparative Example 2

A separator and a secondary battery were obtained in the same manner as Example 1, except that a film substrate made of polyethylene (Z average molecular weight: 995,000, melt index: 1.05 g/10 min, branch content: 1%) were used.

Comparative Example 3

A separator and a secondary battery were obtained in the same manner as Example 1, except that a film substrate made of polyethylene (Z average molecular weight: 640,000, melt index: 4.25 g/10 min, branch content: 30%) were used.

Comparative Example 4

A separator and a secondary battery were obtained in the same manner as Example 1, except that a film substrate made of polyethylene (Z average molecular weight: 1,030,000, melt index: 0.65 g/10 min, branch content: 1.5%) were used.

Comparative Example 5

A separator and a secondary battery were obtained in the same manner as Example 1, except that a film substrate made of polyethylene (Z average molecular weight: 1,005,000, melt index: 0.39 g/10 min, branch content: 3%) were used.

Comparative Example 6

A separator and a secondary battery were obtained in the same manner as Example 1, except that a film substrate made of polyethylene (Z average molecular weight: 1,400,000, melt index: 0.18 g/10 min, branch content: 3%) were used.

Comparative Example 7

A separator and a secondary battery were obtained in the same manner as Example 1, except that a film substrate made of polyethylene (Z average molecular weight: 1,500,000, melt index: 0.18 g/10 min, branch content: 1%) were used.

Comparative Example 8

A separator and a secondary battery were obtained in the same manner as Example 1, except that a film substrate made of polyethylene (Z average molecular weight: 600,000, melt index: 2.3 g/10 min, branch content: 5%) were used.

Comparative Example 9

A separator and a secondary battery were obtained in the same manner as Example 1, except that a film substrate made of polyethylene (Z average molecular weight: 500,000, melt index: 2.0 g/10 min, branch content: 8%) were used.

Comparative Example 10

A separator and a secondary battery were obtained in the same manner as Example 1, except that a film substrate made of polyethylene (Z average molecular weight: 1,100,000, melt index: 5.0 g/10 min, branch content: 5%) were used.

Comparative Example 11

A separator and a secondary battery were obtained in the same manner as Example 1, except that a film substrate made of polyethylene (Z average molecular weight: 1,300,000, melt index: 6.2 g/10 min, branch content: 4%) were used.

Evaluation Results (1) Evaluation of a variation in phase angle at 0.1 Hz depending on an increase in temperature,
(2) Evaluation of a variation in phase angle at a storage modulus G' of $10^5$ Pa,
(3) Evaluation of a variation in viscosity of a polymer, and
(4) Evaluation of a variation in storage modulus G' of a polymer Each evaluation of (1) to (4) was carried out by using a rheometer (TA Co., ARES-G2) as a test machine. Each of the separators according to Examples 1-3 and Comparative Examples 1-11 was loaded between 25 mm circular plates to a height of about 1 mm and tested under nitrogen atmosphere with a strain of 0.3% (linear region) at a frequency of 0.1-500 rad/s.

Figure 2:
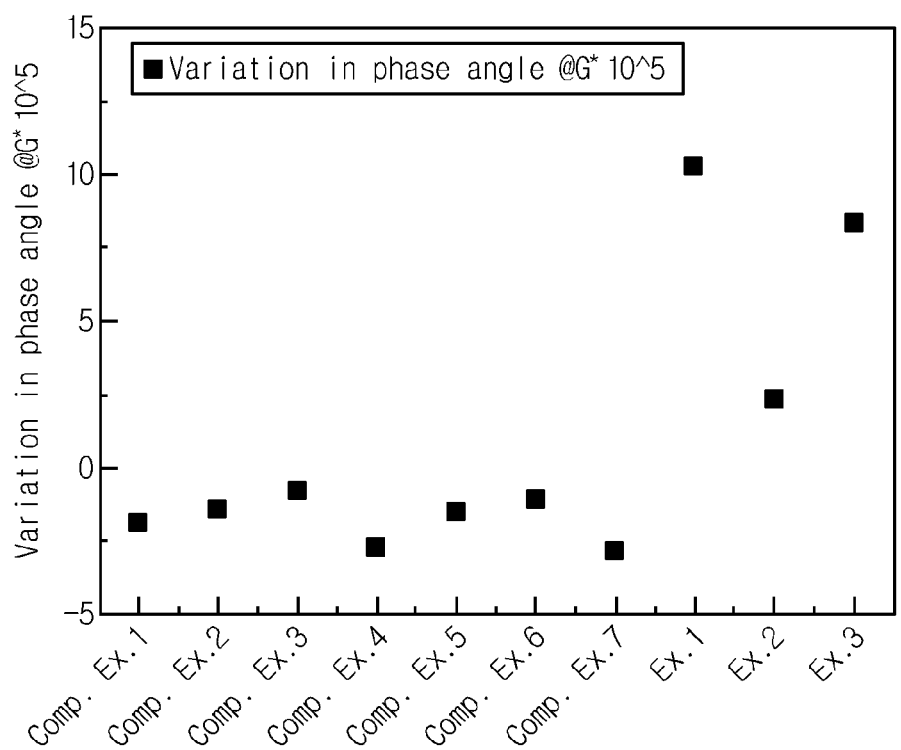
FIG. 2 is a graph illustrating the results of evaluation of a variation in phase angle at a storage modulus G' of $10^5$ Pa for each of the separators according to Examples 1-3 and Comparative Examples 1-7.
Figure 3:
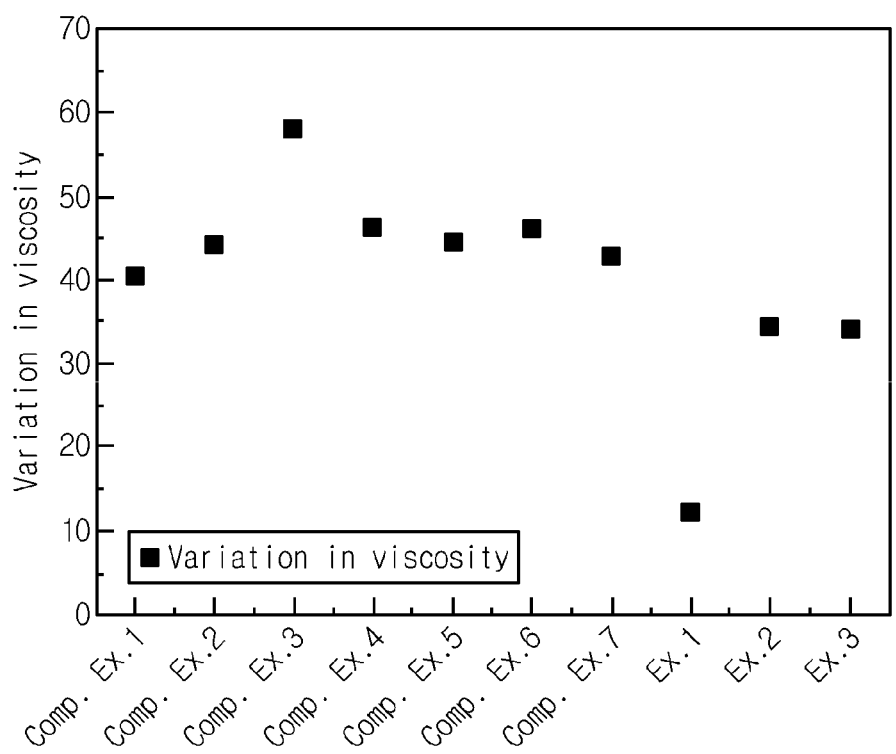
FIG. 3 is a graph illustrating the results of evaluation of a variation in viscosity for each of the separator polymers according to Examples 1-3 and Comparative Examples 1-7.
Figure 4:
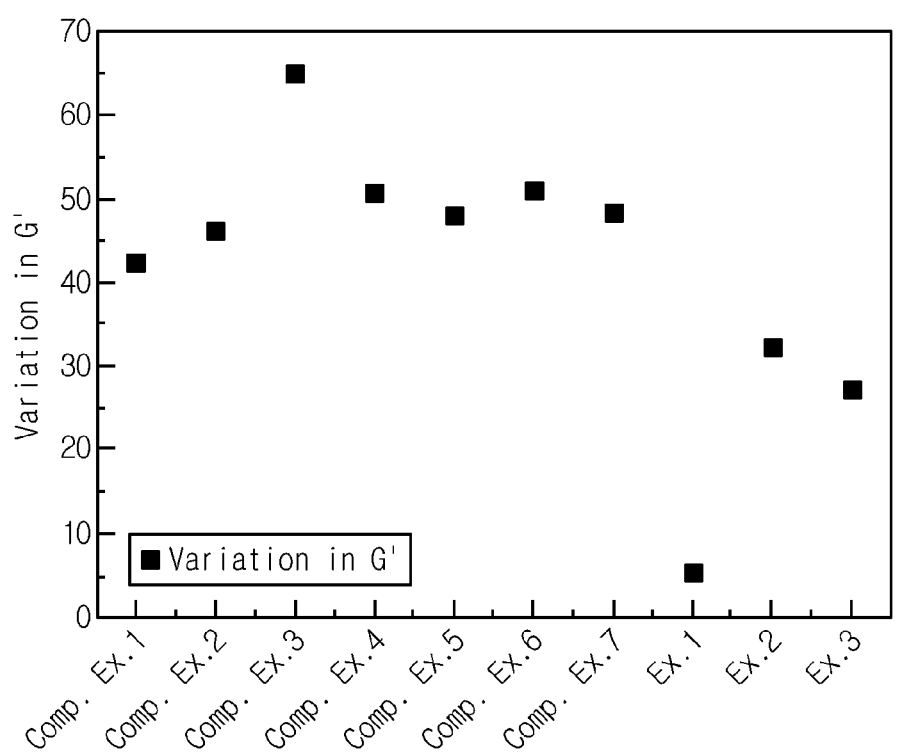
FIG. 4 is a graph illustrating the results of evaluation of a variation in storage modulus G' for each of the separator polymers according to Examples 1-3 and Comparative Examples 1-7.

Test results for each of the separators according to Examples 1-3 and Comparative Examples 1-11 are shown in the following Table 1. In addition, the test results for each of the separators according to Examples 1-3 and Comparative Examples 1-7 are shown in FIGS. 1-4.

TABLE 1

|  | Variation (%) in phase angle at 0.1 Hz depending on increase in temperature | Variation (%) in phase angle at a storage modulus G' of $10^5$ Pa | Variation (%) in viscosity of polymer | Variation (%) in storage modulus G' of polymer |
| --- | --- | --- | --- | --- |
| Ex. 1 | 7.5 | 10.0 | 11.0 | 6.0 |
| Ex. 2 | 2.5 | 2.5 | 33.0 | 32.5 |
| Ex. 3 | 6.3 | 8.5 | 32.5 | 27.5 |
| Comp. Ex. 1 | −3.0 | −2.0 | 41.0 | 42.5 |
| Comp. Ex. 2 | −3.0 | −1.5 | 43.5 | 46.0 |
| Comp. Ex. 3 | −6.3 | −1.0 | 57.0 | 65.0 |
| Comp. Ex. 4 | −4.0 | −3.0 | 47.0 | 50.0 |
| Comp. Ex. 5 | −3.7 | −1.7 | 43.5 | 47.5 |
| Comp. Ex. 6 | −6.5 | −1.25 | 45.0 | 50.0 |
| Comp. Ex. 7 | −7.0 | −3.5 | 42.5 | 47.5 |
| Comp. Ex. 8 | −2.5 | −2.0 | 40.0 | 36.0 |
| Comp. Ex. 9 | −2.0 | −2.3 | 40.0 | 40.0 |
| Comp. Ex. 10 | −2.0 | −2.2 | 50.0 | 55.0 |
| Comp. Ex. 11 | −5.0 | −2.6 | 45.0 | 50.0 |

(5) Evaluation of Nail Stability of Secondary Battery

Each of the secondary batteries according to Examples 1-3 and Comparative Examples 1-11 was fully charged at 25° C. under a voltage of 4.25 V, and a nail having a diameter of 3 mm was used to perforate the center of each battery. Then each battery was observed whether ignition occurred or not. The nail perforation rate was 80 mm/sec. The results are shown in the following Table 2.

TABLE 2

|  | Nail stability test results |
| --- | --- |
| Ex. 1 | No change |
| Ex. 2 | No change |
| Ex. 3 | No change |
| Comp. Ex. 1 | Ignition |
| Comp. Ex. 2 | Ignition |
| Comp. Ex. 3 | Ignition |
| Comp. Ex. 4 | Ignition |
| Comp. Ex. 5 | Ignition |
| Comp. Ex. 6 | Ignition |
| Comp. Ex. 7 | Ignition |
| Comp. Ex. 8 | Ignition |
| Comp. Ex. 9 | Ignition |
| Comp. Ex. 10 | Ignition |
| Comp. Ex. 11 | Ignition |

Referring to Tables 1 and 2, Examples 1-3 wherein each of the variations of (1)-(4) in Table 1 satisfies the above-defined range show high stability in the nail stability test. On the contrary, Comparative Examples 1-11 not satisfying the above-defined range of variations show a problem of ignition in the nail stability test. In addition, it can be seen that each of the polymers forming the porous polymer substrates of the separators according to Examples 1-3 wherein each of the variations of (1)-(4) in Table 1 satisfies the above-defined range has a Z average molecular weight of 700,000-2,000,000; a melt index (MI) of 0.05-4 g/10 min; and a branch content of 5-25%.

What is claimed is:

1. A separator comprising:
   a porous polymer substrate comprising a polymer, wherein the polymer has a Z average molecular weight of 800,000-1,200,000, a melt index of 0.4-2.0 g/10 min, and a branch content of 8-20%; and
   a porous coating layer comprising a plurality of inorganic particles and a binder polymer, wherein
   the porous coating layer is on at least one surface of the porous polymer substrate, and
   the melt index (MI) of a polymer particularly corresponds to a high-load melt index, and is determined according to ASTM D1238 at 190° C. under a load of 21.6 kg, and the polymer is polyethylene.

2. A separator which comprises a porous polymer substrate comprising a polymer having a variation in phase angle at 0.1 Hz depending on an increase in temperature in accordance with an equation:

Variation in phase angle at 0.1 Hz=[(Phase angle$_{190}$−Phase angle$_{280}$)/(Phase angle$_{190}$)]×100≥0%, wherein Phase angle$_{190}$ is the phase angle of the porous polymer substrate at 0.1 Hz and 190° C., and Phase angle$_{280}$ is the phase angle of the porous polymer substrate at 0.1 Hz and 280° C.,
   the polymer has a Z average molecular weight of 800,000-1,200,000, a melt index of 0.4-2.0 g/10 min, and a branch content of 8-20%,
   the variation in phase angle at 0.1 Hz depending on an increase in temperature is measured using a rheometer (TA Co., ARES-G2), and
   the melt index (MI) of a polymer particularly corresponds to a high-load melt index, and is determined according to ASTM D1238 at 190° C. under a load of 21.6 kg, and the polymer is polyethylene.

3. The separator according to claim 2, wherein a thickness of the porous polymer substrate is 1 to 100 μm.

4. The separator according to claim 2, wherein a thickness of the porous polymer substrate is 5 to 50 μm.

5. The separator according to claim 2, wherein the polymer has the Z average molecular weight of 800,000-1,050,000.

6. The separator according to claim 2, wherein the polymer has the branch content of 8-10%.

7. The separator according to claim 2, wherein the polymer has a variation in viscosity in accordance with an equation:

Variation in viscosity=[(η$_{190}$−η$_{280}$)/(η$_{190}$)]×100≤35%, wherein η$_{190}$ is the viscosity of the porous polymer substrate at 190° C., and
   η$_{280}$ is the viscosity of a porous polymer substrate at 280° C.

8. The separator according to claim 2, wherein the polymer has a variation in storage modulus G' in accordance with an equation:

Variation in storage modulus=[(G'$_{190}$−G'$_{280}$)/(G'$_{190}$)]×100≤35%, wherein $G'_{190}$ is the storage modulus of the porous polymer substrate at 190° C., and $G'_{280}$ is the storage modulus of a porous polymer substrate at 280° C.

9. The separator according to claim 2, wherein the polymer has a variation in phase angle at a storage modulus G' of the polymer of $10^5$ Pa in accordance with an equation:

Variation in phase angle at a storage modulus of $10^5$ Pa=[(Phase angle$_{190}$−Phase angle$_{280}$)/(Phase angle$_{190}$)]×100≥0%, wherein Phase angle$_{190}$ is the phase angle of the porous polymer substrate at 190° C., and Phase angle$_{280}$ is the phase angle of the porous polymer substrate at 280° C.

10. The separator according to claim 2, which further comprises a porous coating layer on at least one surface of the porous polymer substrate, and containing a plurality of inorganic particles and a binder polymer on the whole or a part of the surface of the inorganic particles to connect the inorganic particles with each other and fix them.

11. The separator according to claim 10, wherein the porous coating layer is disposed on both surfaces of the porous polymer substrate.

12. The separator according to claim 10, wherein a thickness of the porous coating layer is 1 to 10 μm.

13. The separator according to claim 10, wherein the binder polymer is any one selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan, carboxymethyl cellulose, and combinations thereof.

14. The separator according to claim 10, wherein the inorganic particles comprise inorganic particles having a dielectric constant of 5 or more, inorganic particles having lithium ion transportability or a combination thereof.

15. The separator according to claim 14, wherein the inorganic particles having a dielectric constant of 5 or more is selected from the group consisting of $BaTiO_3$, $Pb(Zr,Ti)O_3$ (PZT), $Pb(Mg_3Nb_{2/3})O_3PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, AlO(OH), $Al_2O_3·H_2O$, $TiO_2$ and SiC.

16. An electrochemical device comprising a cathode, an anode and a separator interposed between the cathode and the anode, wherein the separator is defined in claim 2.

17. The electrochemical device according to claim 16, which is a lithium secondary battery.

* * * * *